March 14, 1933. H. S. JANDUS ET AL 1,901,601
BUMPER WITH CUSHIONED ENDS
Filed Oct. 8, 1931
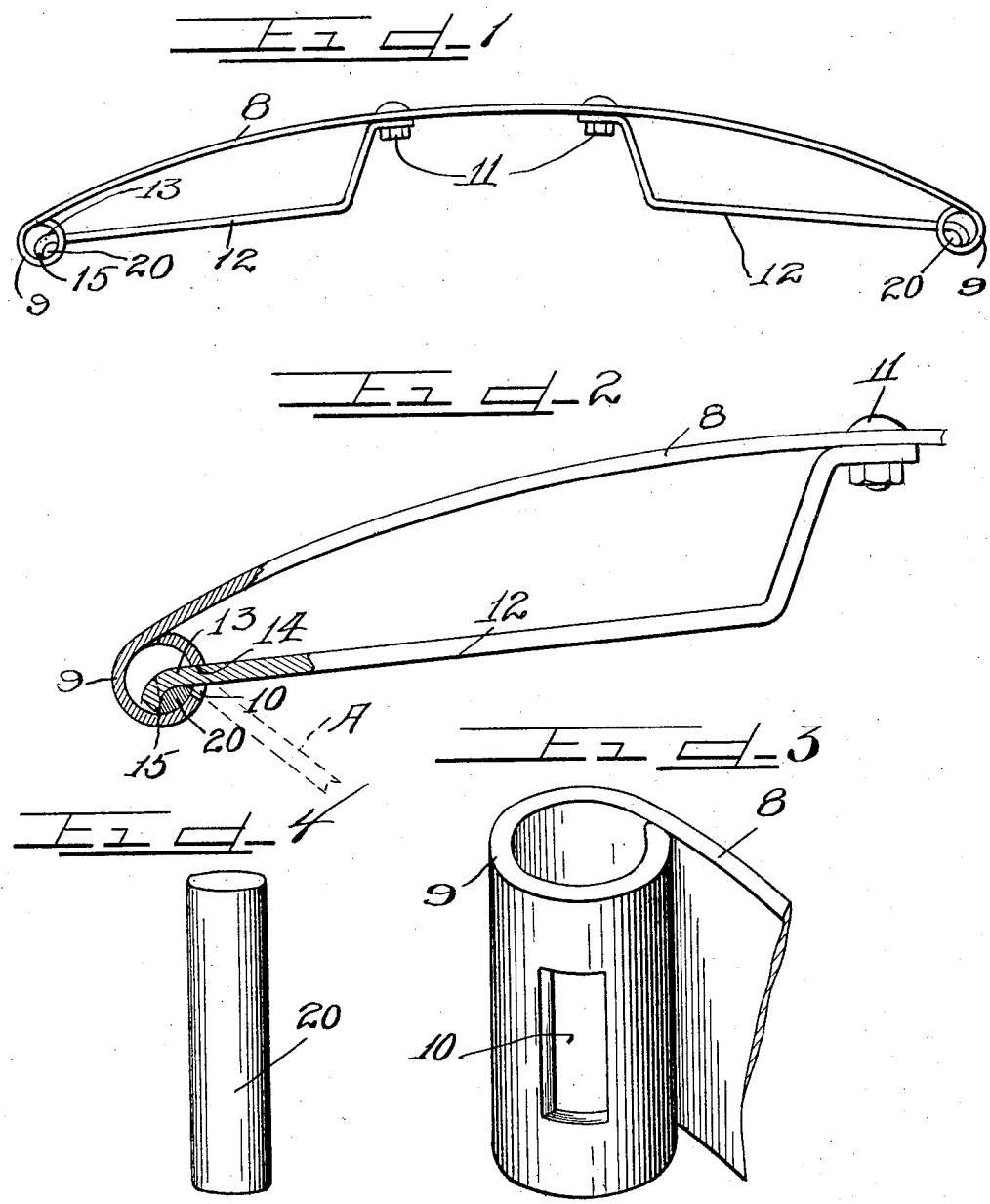
Inventors
Harold Lee Brooke
Herbert S. Jandus Patented Mar. 14, 1933

1,901,601

UNITED STATES PATENT OFFICE

HERBERT S. JANDUS AND HAROLD LEE BROOKE, OF DETROIT, MICHIGAN, ASSIGNORS TO GENERAL SPRING BUMPER CORPORATION, OF DETROIT, MICHIGAN, A CORPORATION OF MICHIGAN

BUMPER WITH CUSHIONED ENDS

Application filed October 8, 1931. Serial No. 567,620.

This invention relates to bumpers, and more particularly to means for forming a cushion at each end of the bumper between the parts terminating at each bumper end.

The object of this invention is to provide a bumper with cushioning means at each of its ends for taking up any possible lost motion due to deforming the bumper and to thereby minimize rattling between the parts of the bumper.

In accordance with the general features of this invention, there is provided a bumper construction comprising impact bar and back bar means having wedged interconnected portions at the ends of the bumper and cushioning means at each of the ends between the interconnected portions for minimizing rattling of the portions.

Other objects and features of this invention will more fully appear from the following detailed description, taken in connection with the accompanying drawing which illustrates a single embodiment thereof, and in which Figure 1 is a plan view of a bumper constructed in accordance with the features of this invention;

Figure 2 is an enlarged plan view of a portion of the bumper shown in Figure 1 and being partly in section;

Figure 3 is an enlarged fragmentary perspective view of the bumper eye construction; and Figure 4 is an enlarged perspective view of one of the cushioning members adapted for use in the ends of the bumper construction.

The bumper construction includes a front bumper bar 8 having eyes 9, each eye having a slot or opening 10. The back bar construction may be of the character involving a pair of elements overlapping centrally and arranged to be connected to the front bar by a central clamp or the corresponding ends of the rear bar element may be in spaced relationship as shown and individually connected to the front bar by a clamp 11. Each back bar portion 12 has a curved end 13 which is extended into the eye 9 through the opening 10 in the manner indicated by the dotted lines at A.

The opening 10 is substantially rectangular and is of such dimension as to just allow the end 13 of the bar 12 to enter the eye 9. Once the end 13 is in the eye 9, the bar portion 12 is turned to the position shown in full lines and clamped at 11; the parts being so formed that this action requires a certain degree of pressure thus causing the portion 14 adjacent the end 13 and the extremity 15 of the end 13 to wedge with considerable pressure against the forward wall of the opening 10 and the interior of the eye 9 respectively. The rear bar portion 12 thus effectively constitutes a cushioning member and is so constructed that it cannot be accidentally removed from the impact bar eye.

The present invention has to do with the insertion of a cushioning member 20 between the curved end 13 of the back bar portion 12 and the adjacent inner surface of the rear wall of the tube or eye 9. This resilient member 20 may be made of any suitable resilient material such as rubber, and has an oval cross-section. In the assembling of the bar, this resilient member or piece 20 is positioned between the hooked or curved end 13 of the back bar portion 12 and the inner wall of the eye 9 while the back bar is in the dotted position shown at A in Figure 2. Thereafter when the back bar is firmly clamped in place by the bolt 11 the rubber of the piece 20 is compressed whereby that piece or member is held tightly in proper position in the bumper end.

This construction is advantageous in that it enables the curved end 13 of the back bumper bar 12 to have a cushioned seat inside of the eye 9 of the bumper end whereby any possible lost motion due to deforming the bumper is taken up and whereby rattling in the bumper itself is reduced to a minimum.

Now we desire it understood that although we have illustrated and described in detail the preferred embodiment of our invention, the invention is not to be thus limited but only insofar as defined by the scope and spirit of the appended claims.

We claim as our invention:

1. As an article of manufacture, a bumper construction comprising impact bar means and back bar means having wedged interconnected portions with cushioning means between the portions.

2. In a bumper, an end construction including a bumper bar having an eye provided with an opening, a second bar having an incomplete eye portion disposed in said eye and extending through said opening, means positively preventing removal of said portion from said eye, and cushioning means between said portion and the eye.

3. In a bumper, an end construction including a bumper bar having an eye provided with an opening, a second bar having an incomplete eye portion disposed in said eye and extending through said opening, means positively preventing removal of said portion from said eye, and cushioning means between said portion and the eye, said cushioning means including a resilient pin of oval cross-section.

4. As an article of manufacture, a bumper construction comprising impact bar means and back bar means having wedged interconnected portions with cushioning means between the portions, said cushioning means including a resilient pin disposed in a vertical position between the interconnected portions.

5. In a bumper, an end construction including a bumper bar having an eye provided with a vertical window-like opening, a second bar having a hook-like end portion disposed in said eye and extending through said opening, said bars being relatively movable to effect an interlocking of said portion with said eye, and cushioning means between said eye and said portion.

6. In a bumper end construction, a plurality of parts between which some play may occur and cushioning means between the parts for resisting such play between the parts and to thereby minimize rattling in the bumper end, and means spaced from said cushioning means for holding the same and said parts in assembled relation.

7. In a bumper, an end construction including a bumper bar having an eye provided with an opening, a second bar having an incomplete eye portion disposed in said eye and extending through said opening, and cushioning means between said portion and the eye.

8. In a bumper, an end construction including a bumper bar having an eye provided with an opening, a second bar having an incomplete eye portion disposed in said eye and extending through said opening, and cushioning means compressed between said portion and the eye.

9. In a bumper, an end construction including a bumper bar having an eye provided with an opening, a second bar having an end portion disposed in said eye and extending through said opening, cushioning means between said portion and the eye, and means for holding the parts in assembled relation with the cushioning means compressed between said portion and the eye.

10. In a bumper, an end construction including a bumper bar having an eye provided with an opening, a second bar having an end portion disposed in said eye and extending through said opening, cushioning means between said portion and the eye, and means remote from the eye for holding the parts in assembled relation with the cushioning means compressed between said portion and the eye.

11. In a bumper, bars having cooperating end portions providing together an opening, cushioning means in said opening and between said portions, and means for holding said portions and said cushioning means in assembled relation.

12. In a bumper construction, a pair of bars fulcrumed to each other, cushioning means between the bars to prevent rattling, and means spaced from said cushioning means for connecting the bars.

13. Bumper end construction comprising a pair of bars fulcrumed to each other intermediate their respective ends, cushioning means between the bars on one side of the fulcrum, and means on the other side of the fulcrum for connecting said bars.

14. Bumper end construction comprising a pair of bars fulcrumed to each other intermediate their respective ends, cushioning means under compression between the bars on one side of the fulcrum, and means on the other side of the fulcrum for connecting said bars.

In testimony whereof, we have hereunto subscribed our names at Detroit, Wayne County, Michigan.

HERBERT S. JANDUS.
HAROLD LEE BROOKE.